United States Patent [19]

Auweiler et al.

[11] Patent Number: 5,067,250
[45] Date of Patent: Nov. 26, 1991

[54] DEVICE FOR MEASUREMENT OF GAP AND FLUSH

[75] Inventors: Willi Auweiler, Cologne; Bernd Solbach, Pulheiml; Robert Luetzeler, Cologne, all of Fed. Rep. of Germany

[73] Assignee: Ford Motor Company, Dearborn, Mich.

[21] Appl. No.: 651,237

[22] PCT Filed: Jul. 31, 1989

[86] PCT No.: PCT/GB89/00872
§ 371 Date: Feb. 8, 1991
§ 102(e) Date: Feb. 8, 1991

[87] PCT Pub. No.: WO90/01672
PCT Pub. Date: Feb. 22, 1990

[30] Foreign Application Priority Data
Aug. 8, 1988 [DE] Fed. Rep. of Germany ....... 3826884

[51] Int. Cl.$^5$ .............................. G01B 7/14
[52] U.S. Cl. ........................ 33/783; 33/533; 33/501.09; 33/832; 33/613
[58] Field of Search ............ 33/783, 784, 791, 792, 33/793, 794, 797, 807, 832, 833, 834, 836, 501.05, 501.08, 501.09, 501.5, 533, 613, 645, 556, 557, 558, 559, 560, 561, DIG. 18, 712

[56] References Cited

U.S. PATENT DOCUMENTS

| | | | |
|---|---|---|---|
| 2,134,262 | 10/1938 | Phillips | 33/797 |
| 2,805,481 | 9/1957 | Locke, Sr. | 33/792 |
| 4,554,742 | 11/1985 | Freetag | 33/783 |
| 4,559,710 | 12/1985 | Koda | 33/783 X |
| 4,606,129 | 8/1986 | Barrowman et al. | 33/501.09 |
| 4,640,014 | 2/1987 | Thomas | 33/501.09 |
| 4,945,651 | 8/1990 | Georg | 33/832 |

Primary Examiner—William A. Cuchlinski, Jr.
Assistant Examiner—C. W. Fulton
Attorney, Agent, or Firm—Daniel M. Stock; Clifford L. Sadler

[57] ABSTRACT

A measuring device is described for measuring the gap and/or flush between two parts (70,71), comprising a housing (1) having a base (13) with an application face (14) which, in use, is placed on the surface of one of the parts (70). A probe (11) projects from the housing (1) and is movable against a return force (35) in the direction of the housing (1), the probe (11) being placed in use against the other of the parts. Electromechanical transducers (2,3) are disposed within the housing (1) for detecting the displacement of the probe (11). To avoid errors caused by improper positioning of the device on the parts (70,71), the base (13) is pivotably connected to the housing (1), and orientation sensing switches (63) are provided for sensing when the axis of the housing (1) is in a predetermined orientation in relation to the base (13).

11 Claims, 3 Drawing Sheets

DEVICE FOR MEASUREMENT OF GAP AND FLUSH

FIELD OF THE INVENTION

The invention relates to a device for measuring the closeness of the fit between two vehicle body panels by measuring the dimensions of gap and/or flush between the panels. The term "gap" is used to indicate the distance between the edges of the panels measured in the planes of the panels whereas the term "flush", is used to represent the amount of misalignment between the planes of the two panels measured along the normal to the planes of the panels. Such a device can be used, for example, in alignment of vehicle of doors and hoods.

DESCRIPTION OF PRIOR ART

A measuring device of this type is disclosed in British Patent Application No. 2,169,706. This known measuring device comprises two probes, which are prestressed in each case by an energy store in such a way that they project from the housing of the measuring device and can be moved into the housing against the force of the energy store. Each probe has a transducer associated with it, which detects the position of the probe and converts it into an electrical signal which can be supplied to an external data-processing system. While one of the two probes is used to measure the gap, it is possible to use the other probe to measure the flush.

A problem with this known measuring device is that before performing a measurement operation its housing must be fixed in a special receiving block in a bodywork template or jig which is arranged in a specified position and into which bodywork parts are inserted for testing.

A further measuring device for gap and flush measurement is disclosed by the German Patent 34 28 635. In the case of this measuring device a longitudinally displaceable testing rod is arranged in a housing, the displacement of the testing rod being converted by an electro-mechanical transducer into electrical signals which can likewise be supplied to an external data-processing unit. One end of the sensing arm projects on one side of the housing in the region of an application base connected to the housing and is used for measuring the flush. A sensing arm, which together with an application arm extending parallel thereto and secured to the housing of the measuring device forms a testing device in the manner of calipers for measuring gap, is secured to the end of the testing rod projecting at the opposite side from the housing. This measuring device is therefore awkward and time-consuming to manipulate, since it must be manipulated differently for gap and flush measurements, so that it is not possible to determine these values simultaneously. In addition, it is necessary to position the application base precisely on an area of the bodywork in such a way that the axis of the testing rod extends at right angles to the application surface, since measurement errors can otherwise arise. In this positioning procedure inaccuracies can easily occur which result in measurement errors.

OBJECTS OF THE INVENTION

The invention seeks to provide a measuring device for gap and flush measurement which permits measurements to be taken by positioning the measuring device on any desired area of a vehicle body and which reduces the risk of positioning errors.

SUMMARY OF THE INVENTION

According to the present invention, there is provided a device for measuring the gap and/or flush between two parts, which comprises a housing having a base with an application face which, in use, is placed on the surface of one of the parts, a probe which projects from the housing and which is movable against a return force in the direction of the housing, the probe being placed in used against the other of the parts, and at least one electro-mechanical transducer disposed within the housing for detecting the displacement of the probe, characterised in that the base is pivotably connected to the housing, and orientation sensing means are provided for sensing when the housing is in a predetermined orientation in relation the base.

In the preferred embodiment of the invention, the measuring device has a special base plate and switching devices, by which the correct position of its housing with respect to a predetermined area of a vehicle body or to the base plate thereof lying on the said area is indicated automatically, preferably optically. Only when such an indication is given can the measurement be recorded. Measurement errors which result from defective positioning of the measuring device on the predetermined area of a vehicle body, can thus be avoided.

It is preferred that by positioning the measuring device only once on a specified area, for example a vehicle body, both a gap and a flush measurement can be taken.

The measuring device invention can advantageously be capable of connection any commercially available data-receiving appliance with an analog input.

In practice, it has been found possible to take gap measurements in the range from 0.5 to 10 mm with the invention with a reproducibility, or random error, of approximately 0.1 mm.

BRIEF DESCRIPTION OF THE DRAWINGS

The invention will now be described further, by way of example, with reference to the accompanying drawings, in which.

DESCRIPTION OF THE PREFERRED EMBODIMENT

Figure 1:
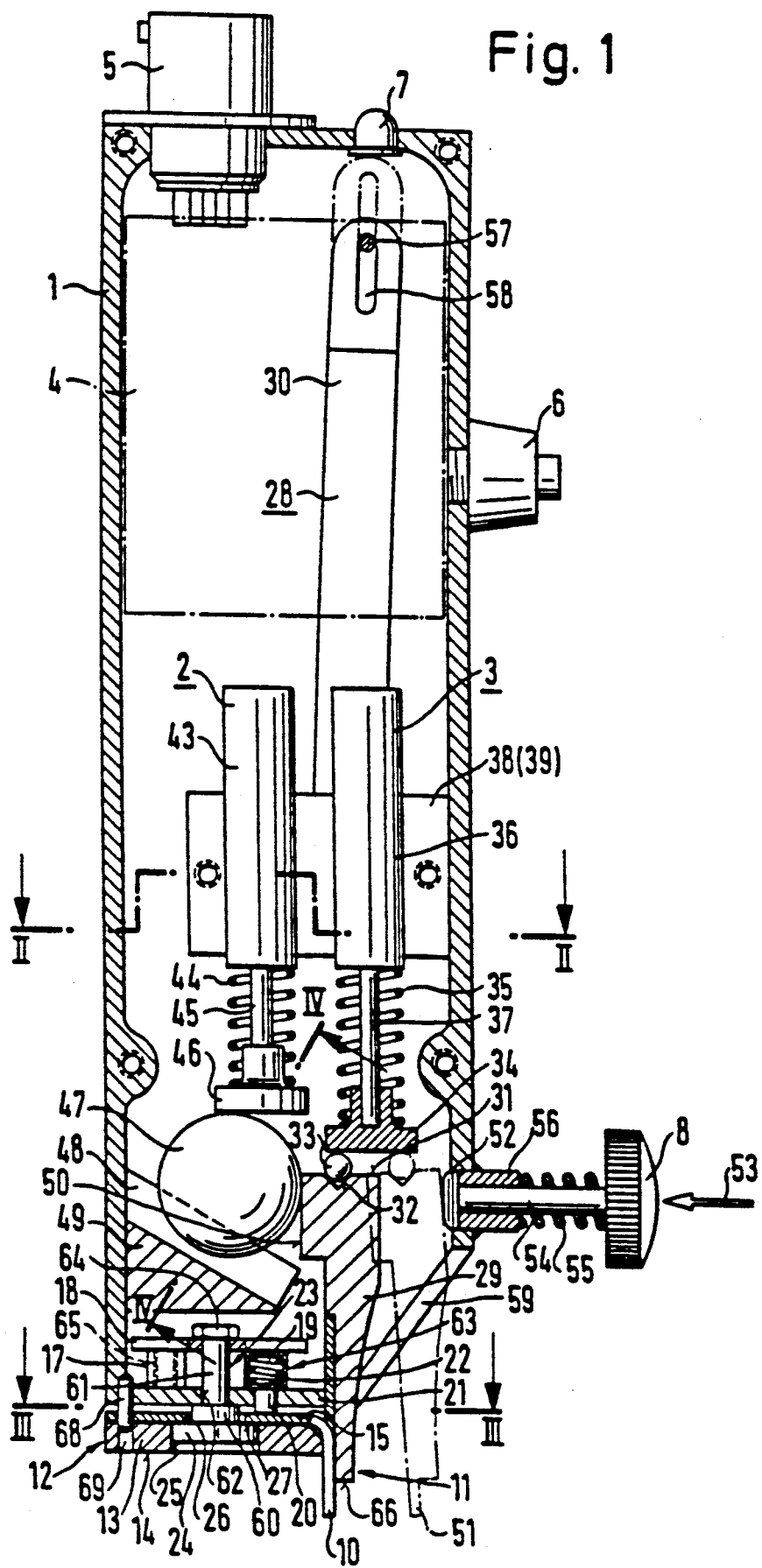
FIG. 1 is a longitudinal section through a preferred embodiment of a measuring device of the invention.

The illustrated measuring device comprises an elongate housing 1, on which there are mounted an electro-mechanical transducer 2 for measuring gap, an electro-mechanical transducer 3 for measuring flush, a probe 11 associated with the transducers 2, 3 for measuring the flush and gap, an electronic circuit 4 for generating electrical measurement signals, and a connection socket 5 for enabling the electronic circuit 4 to be connected to an external data-processing unit, such as a microprocessor. Also mounted on the housing 1 are an attitude sensing device 12, 63 for detecting the correct position of the housing 1, a control lamp 7 which lights up when the housing 1 is correctly positioned, a starter button 6 for initiating a measurement procedure after the housing 1 has been correctly positioned and a control knob 8 for re-setting the probe 11.

The attitude sensing device 12 for determining the correct position of the housing comprises a base plate 13 arranged at the lower end of the elongate housing 1. The base plate 13 is in the form of a circular disc made of a metal or plastics material and its application face 14 forms a first reference plane of the measuring device. Before a measurement procedure is carried out, this face 14 is positioned on a predetermined area, for example of a vehicle body.

A plate 15, the shape of which preferably corresponds to that of the base plate 13 and on one side of which are integrally formed at least two prongs 10 extending at right angles to the plane of the plates 13 and 15, rests on the face of the base plate 13 opposite the free application face 14. The inner faces of the prongs 10 facing the base plate 13 form the second reference plane of the measuring device, which extends at right angles to the first reference plane. The distance between the two prongs 10 is such that the tip of the probe 11 can engage in the gap formed between them in such a manner that its side face towards the base plate 13 lies in the second reference plane.

The base plate 13 and the plate 15 are loosely secured to the housing 1 by a bolt 23. The bolt 23 has a head 24 which is mounted in a bore 25 in the base plate 13 so as to be axially displaceable. The plate 15, which is securely connected by screws, to the base plate 13 has a bore 26, the diameter of which is smaller than that of the bore 25. In this way, a shoulder 27, on which the face of the head 24 towards it can rest, is formed between the inner face of the bore 25 and the plate 15.

A part 60 of the bolt 23, the diameter of which is smaller than that of the head 24 and than that of the bore 26, extends through the bore 26, in order to allow the housing I to pivot relative to the base plate 13. Since the axial length of the part 60 is greater than the thickness of the plate 15, the base plate 13 and the plate 15 can execute a movement in the axial direction which corresponds to the difference between the axial length of the part 60 and the thickness of the plate 15.

The narrower part of the stepped shank 61 of the bolt 23, the diameter of which is smaller than that of the part 60, extends through a bore 62 in the bottom of the housing 1. A mounting plate 18 is held parallel to the bottom by means of sleeves 17 of at least three switching devices 63, which are soldered on the housing 1. The sleeves are distributed uniformly on a circle about the axis of the bolt 23 and act as spacers.

The mounting plate 18 is pressed against the sleeves 17, by a nut 64 screwed on to the end of the bolt 23 passing through the bore 62 of the base and through the mounting plate 18. A helical spring 19 arranged within each sleeve 17 acts between the mounting plate 18 and the head 22 of a pressure pin 20 passing through a bore in the base of the housing 1 and presses the pressure pin 20 against the surface of the plate 15.

Each switching device 63 is designed in such a way that it operates switching contacts, not shown in detail, and generates an electrical signal when the pressure pin 20 is moved a predetermined distance into the sleeve 17 against the force of the spring 19. If, therefore, all the switching devices 63 generate a switching signal, it is ensured that the base plate 13, i.e. the first reference plane, is oriented precisely at right angles to the longitudinal axis of the housing. When the three switching signals are present, the control lamp 7 is illuminated, in order to show the operator the correct position of the housing. In addition, only when the three switching signals are present can the measuring procedure be initiated by actuation of the starter button 6. In the electronic circuit 4, when the three switching signals are present, an output signal is generated by an AND logic element for the control lamp 7 and for permitting the measurement procedure by actuating the starter button 6.

In the illustrated embodiment of the invention the housing 1 is also rotatable through a predetermined angle about the axis of the bolt 23 relative to the base plate 13 and the plate 15. The angle is limited by a pin 68 which projects from the housing 1 and engages in an arcuate slot 69 in the plate 15, and where appropriate also in the base plate 13. This arrangement makes it possible to avoid errors in manipulation, which could arise as a result of rotation of the housing about its longitudinal axis if it we e fast in rotation with the base plate (15).

The electro-mechanical displacement transducers 2 and 3 for measuring the gap width and flush and of the mechanical parts associated therewith will now be described in greater detail.

Figure 2:
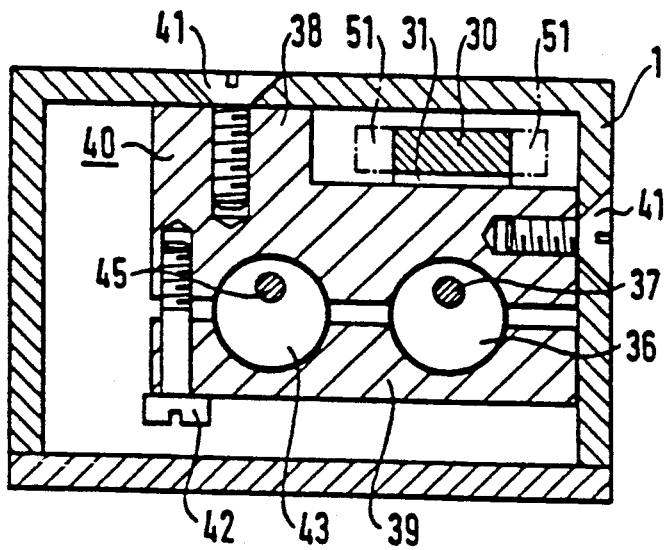
FIG. 2 is a section along the line II—II in FIG. 1.
Figure 3:
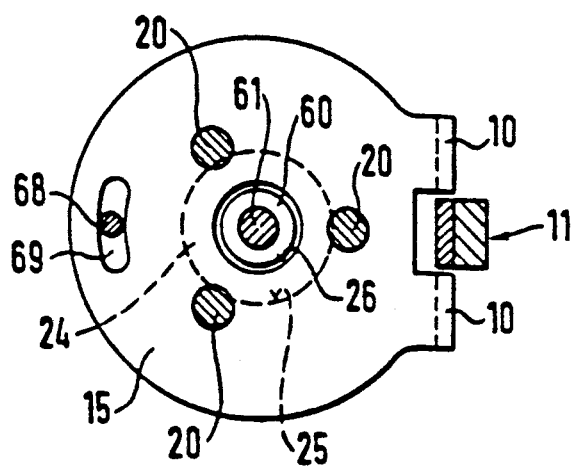
FIG. 3 is a section along the line III—III in FIG. 1.
Figure 4:
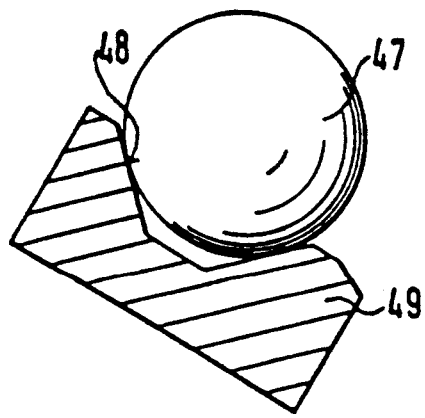
FIG. 4 is a section along the line IV—IV in FiG. 3.

The probe 11 is arranged on the end of a sensing arm 28, which has a lower region 29 and an upper region 30 which extend parallel to each other and are laterally offset with respect to each other in the direction perpendicular to the plane of the drawing in FIG. 1, so that a shoulder 31 extending perpendicular to the plane of the drawing is formed between them. A tapered depression 32, the opening angle of which amounts to 120° for example and in which a ball 33 is secured by welding for example, is provided on the shoulder 31. A head 34 on a push rod 37, which can be moved against the force of a spring 35 into a spring cage 36, presses against the free end of the ball 33. The spring cage 36 of the transducer 3 is held, as shown in FIG. 2, between the jaws 38 and 39 of a clamping device 40 which is secured to the inner walls of the housing 1. This clamping device 40 comprises a block which is secured to the housing 1 with the aid of screws 41. The spring cage 36 is clamped in the device 40 means by way of a screw 42.

In a similar manner, a further spring cage 43, together with a spring 44, a push rod 45 and a flanged head 46 forms the transducer 2 for measuring the gap width, which is constructed in a manner similar to the transducer 3 and is secured within the clamping device 40. The head 46 rests on a ball 47 which is mounted so as to be slidable in a groove 48 in a guide rail 49 secured to opposite sides of the housing 1. The guide rail 49 extends obliquely to the face of the base plate 13 and the groove 48 is oriented downwards towards the probe 11. The projection of the groove 48 preferably lies on the diameter of the plate 15 which extends through the middle of the gap formed between the prongs 10.

The ball 47 is pressed by its own weight and by the force of the spring 44 into the groove 48 and downwards in the groove 48, so that it rests on an application surface 50 of the lower region 29 of the sensing arm 28. This means that the free end of the lower region 29 which forms the probe 11 is moved by the forces of the ball 47 and the spring 44 from the second reference plane into a position which is indicated by dash-dot lines 51 in FIG. 1.

In this position the lower region 29 rests with its side remote from the ball 42 on a stop 52 which forms part of the actuating knob 8. The stop 52 is connected to the actuating knob 8 by way of a shift 54 of smaller diameter, the shaft 54 being displaceable in a sleeve 56 in the housing 1 against the force of a return spring 55 surrounding the shaft 54. When the actuating knob 8 moves in the direction of the arrow 53 the lower region 29 resting on the stop 52 is moved together with the ball 47, until the probe 11 reaches the second plane with the face towards the base plate 13.

In order to allow the sensing arm 28 or the probe 11 to move between the two said positions shown in FIG. 1, the upper end of the sensing arm 28 is mounted so as to be rotatable about a pivot 57. This pivot 57 is preferably formed by a pin which is received in an elongate slot 58 extending in the longitudinal direction of the sensing arm 28. The ends of the pin forming the pivot 57 are preferably secured in opposite lateral faces of the housing 1. On account of the elongate slot 58 it is possible for the sensing arm 28 to be raised upwards against the force of the spring 35.

It should be mentioned that the push rod 45 of the transducer 2 for measuring the gap width can also engage on the sensing arm 28 in different ways. The described embodiment with the ball 47 has the advantage, however, that the housing can be made particularly narrow at right angles to its longitudinal axis, thereby ensuring easy manipulation.

The lower end of the lower region 29 passes through the outlet opening 59 of the housing 1, which is formed by the corner areas of the housing 1 opposite one another underneath the actuating knob 8 being canted obliquely.

The probe 11 at the lower end of the sensing arm 28 is provided on its outside remote from the base plate 13 with a step which forms a face 66 which, when the probe 11 is moved into the second reference plane, then extends at right angles to the second reference plane and in the extended state of the sensing arm 28 is below the first reference plane. A flush of ±4 mm can then be measured.

Figure 5:
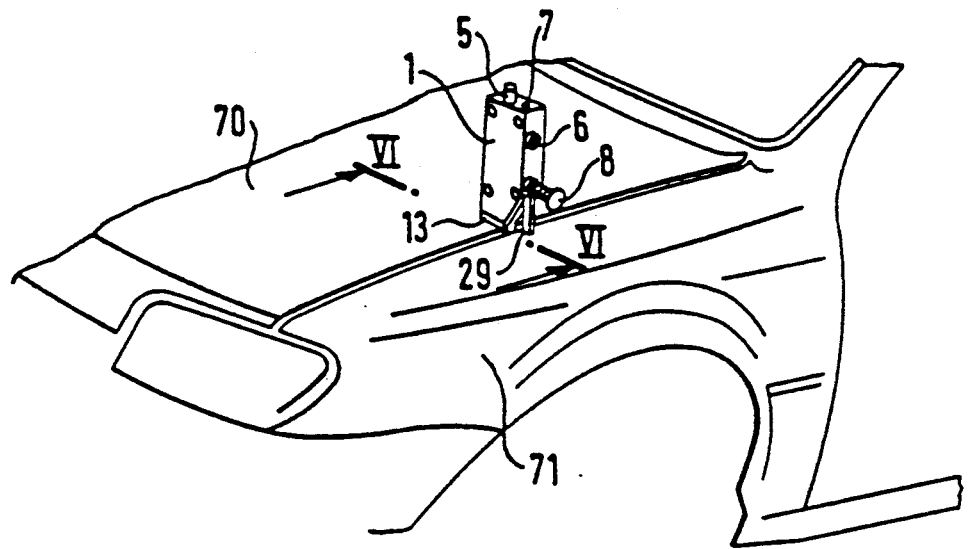
FIGS. 5 and 6 are illustrations to explain the manipulation of the present measuring device.
Figure 6:
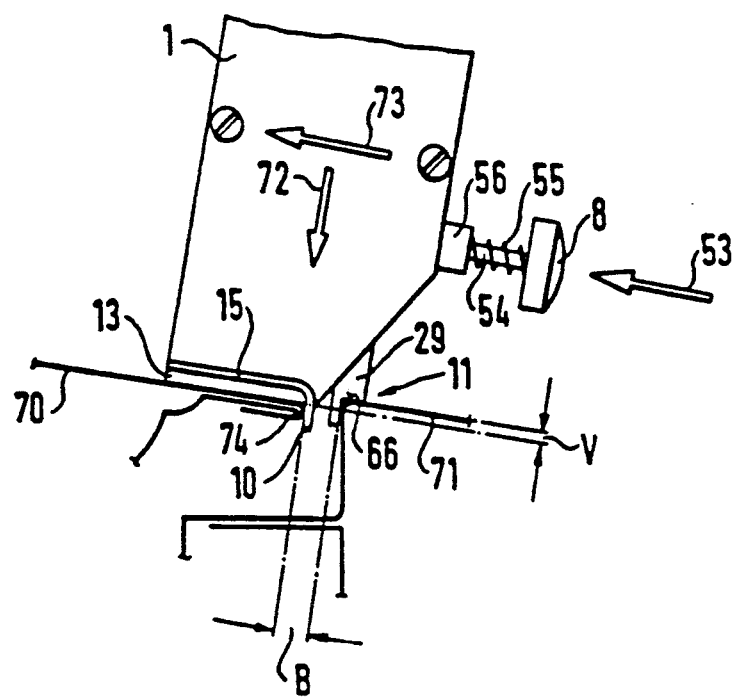

The manipulation of the present measuring device while measuring a gap between the engine hood and the fender of a motor vehicle will now be described in greater detail below by reference to FIGS. 5 and 6.

In order to measure at the same time the flush between the surface of the edge of the engine hood 70 and the adjacent surface of the fender 71 and the gap width between the mutually opposite edges of the engine hood 70 and the fender 71, the sensing are 28 is first moved by pressing the actuating knob 8 in the direction of the arrow 53 in such a way that the face of the probe towards the base plate 13 reaches the second reference plane.

Next, the free face 14 of the base plate 13 is placed on the surface of the edge area of the fender 70 from above (arrow 72). Simultaneously moving the housing 1 in the direction of arrow 73 causes the end edge 74 of the engine hood 70 to be moved into the second reference plane. During this procedure, the operating knob 8 is released at the same time and the housing 1 is moved in such a way that the edge area of the fender 71 opposite the engine hood 70 rests against the probe 11 and the face 66 rests against the surface of the fender 71.

The housing 1 is now moved to align it perpendicular to the plane of the hood and when it is correctly positioned all three switching devices 63 generate a switching signal and the control lamp 7 is activated. It is then ensured that the housing 1 and the probe 11 arranged therein are Ⓡ oriented in a reproducible manner with respect to the base plate 13.

When the three switching signals are present the measurement operation can now be initiated by actuating the starter button 6. At this time, the amount of displacement of the push rod 45 of the transducer 2 (gap-width measurement) corresponding to the twisting of the probe 11 out of the second reference plane is measured and converted into an electrical signal. This electrical signal is then a measure of the gap width B between the second reference plane a d the face of the probe 11 remote from the base plate 13, i.e. of the gap width between the mutually facing edges of the fender 71 and the engine hood 70. At the same time the position or displacement of the push rod 37 from an initial position in which the sensing arm 28 is moved completely down, i.e. in which the shaft 57 rests against the upper end of the slot 58, is measured and converted into a further electrical signal. This further electrical signal is a measure of the flush V between the first reference plane and the face 66, i.e. between the surface of the edge region of the engine hood 70 and the opposite surface of the fender 71.

The switching signals detected are transmitted by the electronic circuit 4 by way of the connection socket 5 to the external data-processing unit and there they are evaluated and displayed.

Instead of the connection to an external data-processing unit, the present measuring device can also be provided with a display device, for example in the form of an LED display or the like, on which the measured gap width and/or the measured flush are displayed directly.

We claim:

1. A measuring device for measuring the gap and/or flush between two parts (70, 71), comprising
    a housing (1) having a base (13) with an application face (14) which, in use, is placed on the surface of one of the parts (70),
    a probe (11) which projects from the housing (1) and which is movable against a return force (35) in the direction of the housing (1), the probe (11) being placed in used against the other of the parts, and
    at least one electro-mechanical transducer disposed within the housing (1) for detecting the displacement of the probe, characterised in that
    the base (13) is pivotably connected to the housing (1), and
    orientation sensing means (63, 7) are provided for sensing when the housing is in a predetermined orientation in relation to the base (13).

2. A measuring device as claimed in claim 1, characterised in that the base (13) is connected to a plate (15) which includes at least two prongs (10) extending substantially at right angles to the application face (14) of the base and projecting beyond the application face (14) and can be positioned against an edge of the surface of one part (70), and in that the probe (11) can be arranged in the gap between the prongs (10) in such a way that its side facing towards the base plate (13) is in the plane formed by the side of the prongs (10) facing towards the base plate (13).

3. A measuring device as claimed in claim 2, characterised in that the base (13) is mounted so as to be capable of limited axial movement along the longitudinal axis of the housing and limited tilting movement about its centre relative to the housing (1), in that spring means (19) are provided for urging the base (13) away from the housing (1) and in that the orientation sensing means comprise at least three switches distributed about a circle centred on the centre of the base (13) and each actuated in response to a predetermined displacement of the base (13) relative to the housing (1).

4. A measuring device as claimed in claim 3, characterised in that the base (13) is secured to the housing by means of a bolt (23) having a stepped shank of which the head is received in countersunk bore (25,26) defined by the base (13) and the plate (15) secured thereto, the stepped shank having a larger diameter part (60) of greater axial length than the thickness of the plate (15) in order to form a clearance between the plate (15) and the housing (1).

5. A measuring device as claimed in claim 3 wherein a visual indicator is provided for indicating when all the switches are simultaneously actuated.

6. A measuring device as claimed in claim 1 characterised in that the housing (1) can be turned through a predetermined angular range about an axis normal to the application surface (14), the range being limited by a pin (68) projecting from the housing (1) into an arcuate slot (69) in the base.

7. A measuring device as claimed in claim 1, characterised in that the probe (11) is formed by the extension of the lower region (29) of a sensing arm (28) projecting from an opening (59) of the housing (1), the sensing arm (28) being displaceable into the housing (1) against the force of a spring (35) of the electromechanical transducer (3) secured to the housing (1).

8. A measuring device as claimed in claim 7, characterised in that the lower region (29) of the sensing arm (28) project laterally with respect to the upper region (30) of the testing rod (28) to form a shoulder (31) which extends at right angles to the longitudinal axis of the housing (1), a ball (33) is arranged in a depression (32) in the shoulder (31), and a push rod (37) of the electromechanical transducer (3) rests against the side of the ball (33) remote from the shoulder (31), the push rod (37) being movable against the force of the spring (35) of the electro-mechanical transducer (3) as the probe (11) is displaced in the longitudinal direction of the lower region (29) of the sensing arm (28).

9. A measuring device as claimed in claim 8, characterised in that in the housing (1) a further electro-mechanical transducer (2) is provided which acts upon the sensing arm (28) and exerts a force on the probe (11) in a direction to measure gap width.

10. A measuring device as claimed in claim 9, characterised in that the further electro-mechanical transducer (2) has a push rod urged by a spring (44) against a ball (47) which is movable along a groove (48) in a guide rail (49) extending obliquely downwards in the direction towards the base plate (13), and the ball (47) rests on a face of the lower region of the sensing arm (28) perpendicular to the shoulder (30).

11. A measuring device as claimed in claim 10, characterised in that a stop (52) is provided on the side of the lower region (29) of the sensing arm (28) remote from the ball (47), the stop (52) being movable against the force of a spring (56) by an actuating knob (8) serving to reset the position of the probe (11).

* * * * *